Figure 1:
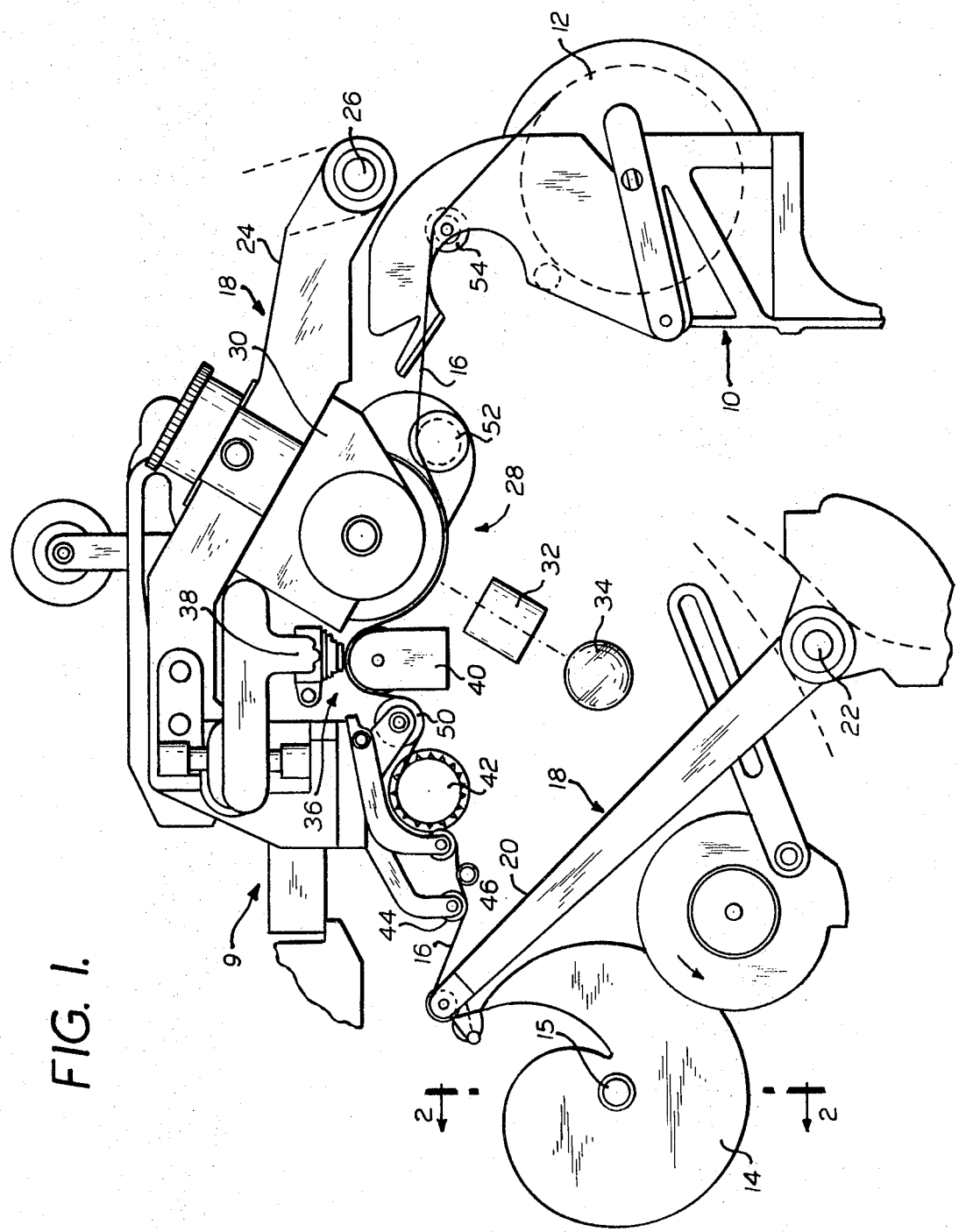

United States Patent

[11] 3,584,250

| [72] | Inventor | Angelo Bottani<br>Milan, Italy |
|---|---|---|
| [21] | Appl. No. | 862,975 |
| [22] | Filed | Oct. 1, 1969 |
| [45] | Patented | June 8, 1971 |
| [73] | Assignee | Societa Internazionale Fonovisione S.p.A.<br>Milan, Italy |
| [32] | Priority | Oct. 26, 1965 |
| [33] | | Italy |
| [31] | | 23972/65 |
| | | Continuation of application Ser. No. 605,435, Dec. 28, 1966, which is a continuation-in-part of application Ser. No. 589,377, Oct. 25, 1966. |

[54] APPARATUS FOR CONTROLLING THE TAKEUP REEL OF FILM PROJECTION APPARATUS
8 Claims, 5 Drawing Figs.

[52] U.S. Cl. .................................................. 310/98, 310/103, 310/105

[51] Int. Cl. .................................................. H02k 49/02
[50] Field of Search .................................................. 310/92, 98, 99, 103, 105, 106

[56] References Cited
UNITED STATES PATENTS

| 2,591,395 | 4/1952 | Bennett | 310/103 |
| 2,902,612 | 9/1959 | Whearley | 310/105 |
| 3,050,646 | 8/1962 | Eddy | 310/98 |

Primary Examiner—D. X. Sliney
Attorney—Hubbell, Cohen & Stiefel

ABSTRACT: A takeup reel and drive therefor in the form of a magnetic field coupling and a motor are mounted on the housing wall of projection apparatus. The output member of the coupling has a shaft which caries a concentric ring of highly permeable magnetic material rotatable without engagement in an adjustable airgap between pairs of magnets mounted on the input rotor of the coupling.

FIG. I.

INVENTOR
ANGELO BOTTANI
BY
Hubbell, Cohen & Stiefel
ATTORNEYS.

INVENTOR
ANGELO BOTTANI

APPARATUS FOR CONTROLLING THE TAKEUP REEL OF FILM PROJECTION APPARATUS

This application is a continuation of my earlier copending application Ser. No. 605,435 filed by me on Dec. 28, 1966 which application is in turn a continuation-in-part of copending application Ser. No. 589,377, filed Oct. 25, 1966.

This invention relates to new and improved apparatus for controlling the takeup reel of film projection apparatus. More particularly, the invention relates to the control of the takeup reel in film projection apparatus of the type in which the film, during the projection, recording, rewinding or printing, etc., thereof, is unwound from a feed reel under the effect of the tractional force exerted on the film by at least one film drive roller, and is in turn wound on to the takeup reel which is arranged to be drivingly rotated by drive motor means.

In order to insure proper operation of film projection apparatus of this nature, it is, of course, essential that the film travel at a predetermined speed past the optical means which effect the projection thereof and, in cases where the film includes a sound track, past the audio means which effect the sound pickup or recording function. Thus, for example, in the projection of a 16-millimeter sound film, it is essential that 24 film frames per second travel past the optical and audio means so as to obtain the best visual and audio reproduction. In this instance, since each frame is substantially 7.62 millimeters in length, a film speed of substantially 182.88 millimeters per second will be required. Once this film runoff speed is determined, as above, provision is made for rotating the film drive requisite, constant film travel speed past the said optical and audio means and, at the same time, make possible the subsequent winding thereof on the motor driven takeup reel.

Owing to the fact that the takeup reel is rotated at a substantially constant angular speed by the said drive motor, there is a tendency, as the thickness of the portion of the film wound on the takeup reel increases, for the tractional force exerted on the film to increase proportionally in that the film is being driven at constant linear speed by the said film drive roller, and at a constantly increasing linear speed by the rotation of the said takeup reel. Thus, unless suitably counteracted, this tendency will ultimately result in breakage of the film at the point where the tractional force exerted thereon by the said takeup reel exceeds the yield point of the film.

In known photographic projection apparatus of this nature, this tendency toward film breakage is counteracted by cooperatively associating conventional frictional coupling means of the type disclosed, for example, in U.S. Pat. No. 3,159,841, with the said takeup reel in such manner that, as soon as the forward portion of the film which is wound on the takeup reel assumes a predetermined thickness, the speed at which the latter is driven is reduced to accordingly reduce the tractional force exerted thereby on the film and maintain the former within safe limits.

Generally, frictional coupling means of this nature take the form of a disc of felt or similar material which is arranged in slip-clutch fashion between a drive disc which is driven by the takeup reel drive motor, and a driven disc which in turn drives the said takeup reel. Thus, slippage between the said felt disc, and the said drive and driven discs, prevents the said frictional force from increasing to a damaging level.

The use of frictional coupling means of this nature generally gives rise to the problem that the said disc tends to become dirty, to tear, and/or to harden, all of which have the effect of causing the felt disc to bind with relation to the said drive and driven disc so that slippage there between fails to occur and a progressively increasing tractional force is exerted on the film by the takeup reel with resultant breakage of the film. As a result, it generally becomes necessary in order to prevent the breakage of the film to replace the said felt disc after a certain number of film projection or alternatively, in cases wherein the said frictional coupling means are adjustable, to adjust the said means to compensate for the above-described wear of the said felt disc.

An additional problem arises during the rewinding of the film on to the feed reel after the projection of the former, in that suitable braking means be provided to control the speed of rotation of the takeup reel during the film-rewinding operation. In practice, the film is usually unwound from the takeup reel, after the completion of projection, by rewinding it onto the feed reel which is, in this instance, drivingly rotated by a drive unit associated therewith. During the film-rewinding operation, the film is disengaged from the drive roller and associated guide means and thus follows a free path of movement from the takeup reel to the feed reel with the former now being disassociated from its drive motor means and being rotated solely by the unwinding of the film therefrom. Thus, if for some reason the rotation of the feed reel is markedly slowed down, or stopped, the rotation of the takeup reel will nonetheless continue due to the inertia thereof whereupon the film will continue to unwind from the takeup reel and will tend to hang out from the takeup reel and possibly snag on an adjacent portion of the film projection apparatus with resultant tearing of the film. In the film projection apparatus of the prior art, this is prevented by the provision of suitable, frictionally operable braking means which controls the rotational speed of the takeup reel during the film-rewinding operation in such manner that improper unwinding of the film therefrom is prevented to insure that the film does not hang out and become snagged as discussed above.

It is, accordingly, an object of this invention to provide new and improved apparatus for controlling the rotational speed of the takeup reel of film projection apparatus during the winding of the film thereon so as to maintain the maximum tractional force exerted by the said takeup reel on the film almost constant and well within the limits imposed by the yield point of the film to thus very materially increase the useful life of the film.

Another object of the invention is the provision of apparatus which include means enabling the convenient adjustment of the said maximum tractional force to make possible the use of the apparatus with films of varying strength characteristics.

Another object of this invention is the provision of apparatus for also controlling the rotational speed of the takeup reel during the unwinding of the film therefrom onto the feed reel during the film rewinding operation to prevent tearing or breakage of the film as might otherwise occur upon accidental slowing down or stoppage of the feed reel.

Another object of the invention is the provision of apparatus as above which are of relatively uncomplicated and inexpensive design and construction and require the use of only readily available components of proven dependability whereby the costs of manufacture thereof are minimized and long periods of satisfactory, maintenance-free operation thereof are assured.

In the herein disclosed preferred embodiment of the invention, these objects are achieved through the coupling of the takeup reel to its associated drive motor assembly through the use of coupling means of the magnetic hysteresis type. The use of this type of coupling means insures that, during periods when the film is being unwound from the feed reel or reels onto the takeup reel, the rotational speed of the latter will commence to lag behind that of its substantially constant speed drive motor assembly once a tractional force of predetermined maximum extent is exerted on the film by the said takeup reel. This rotational speed lag is brought about automatically and in turn insures that the traction force exerted on the film by the driven rotation of the takeup reel is kept within safe limits. In addition, the same coupling means also function automatically to exert a braking action on the takeup reel during periods in which the film is being unwound therefrom back on to the feed reel or reels to prevent tearing or breakage of the film during such periods as discussed above. As currently preferred, the said coupling means take the form of magnetically coupled, relatively rotatable ring and cage assemblies, respectively. The said ring assembly is secured to the takeup reel drive shaft, while the said cage assembly is rotatable by the takeup reel drive motor assembly to rotate the said ring assembly, and thus the takeup reel therewith by virtue of the magnetic coupling are provided to enable the convenient adjustment of the strength of the said magnetic coupling and thus the extent of the maximum tractional force which will be exerted on the film by the takeup reel.

Figure 2:
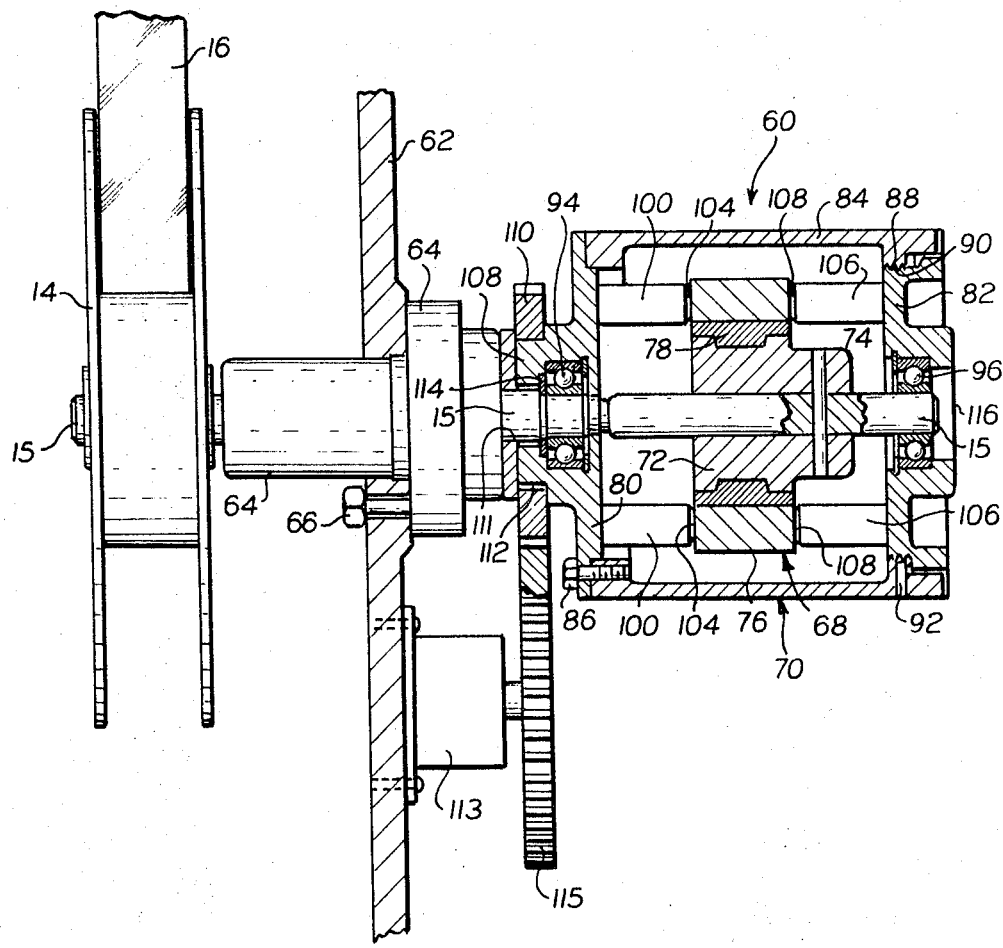

The above and other objects and advantages of this invention are believed made clear by the following detailed description thereof taken in conjunction with the accompanying drawings wherein:

FIG. 1 is a partial, elevational view of automatic, coin- or counter-operated film projection apparatus comprising a plurality of feed reels and a single takeup reel, which apparatus is depicted at the stage of operation thereof wherein a particular film has been selected for projection and is accordingly positioned in appropriate manner for the commencement thereof; and FIG. 2 is a cross-sectional view taken along line 2-2 in FIG. 1.

Referring now to FIG. 1 in detail, film projection of the coin- or counter-operated type are indicated generally at 9, it being noted that the said apparatus is depicted and described in this specification for illustrative purposes only to illustrate a currently preferred utilization of the takeup reel coupling means of the invention. The film projection apparatus 9 comprises a revolvable, feed reel support frame as indicated generally at 10 which supports a plurality of feed reels, only one of which is illustrated as indicated at 12, at the periphery thereof. Each of the said feed reels usually includes a different film wound thereon whereby selective rotation of the said support frame makes possible the movement of any desired one of the said feed reels into the position depicted for feed reel 12 to enable the projection, as described in detail hereinbelow, of the film wound on the said feed reel.

A single takeup reel 14 is provided and is fixedly secured to a rotatable drive shaft 15 to enable the winding of the film, as indicated at 16, thereon through the driven rotation of the said drive shaft during the film projection operation.

Means to thread the film from the selected feed reel through the film projection apparatus and on to the takeup reel 14 are indicated generally at 18 and comprise a lever 20 which is oscillatable about point 22 between a retracted position partially shown by dotted lines and an extended position shown in solid lines in FIG. 1; and a film-pressing member 24, which is oscillatable about point 26 between a retracted position partially shown in dotted lines and an operative position shown in solid lines in FIG. 1. Lever 20 and member cooperate, in a manner believed well known in this art, to automatically thread to end of the film 16 from the feed reel 12 through the film projection apparatus onto the takeup reel 14 prior to the commencement of film projection to maintain the film properly positioned during the projection thereof; and to automatically withdraw to inoperative positions during the rewinding of the film from the takeup reel 14 back onto the feed reel 12 at the completion of the film projection. The optical projection means are indicated generally at 28 and comprise a prism 30 which is carried by the film pressing arm 24, and condensing lens 32 and projection bulb 34 which are supported in conventional manner from the nonillustrated housing of the film projection apparatus.

The audio means are indicated generally at 36 and comprise a sound head 38 supported from the film-pressing arm 24 and a photoelectric cell 40 supported from the apparatus housing in the manner of condensing lens 32 and projection bulb 34. Driven travel of the film 16 through the film projection apparatus is effected by means of the toothed drive roller 42 which is rotatable a substantially constant speed by nonillustrated drive motor means. Guide rollers 44, 46, 48, 50 and 52 and 54, respectfully, function in conventional manner to guide the travel of the film through the film projection apparatus during the film projection operation.

Thus, briefly described, the operation of the film projection apparatus of FIG. 1 may be understood to comprise the selective rotation of feed reel support frame 10 to the position thereof wherein the feed reel 12, upon which is wound the film 16 which it is desired to project, is positioned in the depicted manner, the automatic operation of lever 20 from the dotted position to its solid line position in FIG. 1 to position film 16 over rollers 52, 48, 42 and 46 followed by the automatic movement of film-pressing arm 24 from its dotted line to its solid line position in FIG. 1 to thereby thread the film through the film projection apparatus onto the film takeup reel 14, and the driven rotation of the toothed film drive roller 42 and the said takeup reel to commence the travel of the film 16 through the film projection apparatus with attendant unwinding of the film from the feed reel 12 and winding thereof onto the takeup reel.

Referring now to FIG. 2, a currently preferred form of magnetically operable coupling means for controlling the rotational speed of a film takeup reel in accordance with the objects of this invention, are indicated generally at 60 and are depicted in operative relationship with the takeup reel 14 of film projection apparatus of the nature described in detail hereinabove with regard to FIG. 1. The magnetic coupling means 60 are supported as shown from the film projection apparatus housing wall 62 support means 64 which are turn fixedly secured to the said housing wall by attachment screws 66 extending therebetween. The drive shaft 15 of the film takeup reel 14 is journaled in the support means 64 and extends therefrom as shown to support the takeup reel 14 in the depicted manner adjacent one extremity of the said drive shaft.

The magnetic coupling means 60 of the invention comprise rotatable ring and cage assemblies, as indicated generally at 68 and 70, respectively, which are magnetically coupled as described in detail herein below, to control the speed of rotations of the takeup reel during both the film projection and rewinding operations.

The ring assembly 68 comprises a core 72 of any suitable, nonmagnetic material, for example aluminum, fixedly secured to the takeup reel drive shaft 15 as by connecting pin 74 extending therethrough or as to be rotatable therewith. A ring 76 of any suitable, highly magnetically permeable material, for example soft iron surrounds an enlarged portion of the core 72 as shown, and is preferably affixed to the latter by a layer of any suitable insulative, adhesive material disposed therebetween as indicated at 78. Thus, rotation of the takeup reel 14 and drive shaft 15 will result in corresponding rotation of the highly magnetically permeable ring 76.

The cage assembly 70 comprises spaced, generally laterally extending cover members 80 and 82, respectively, each of which is constructed from any suitable, magnetic material in the manner of ring 76, and a generally cylindrical body member 84, which is constructed of any suitable, nonmagnetic material in the manner of core 72, extending therebetween as shown. The body member 84 is affixed to the cover member 80 by attachment screws 86 extending therebetween; while the cover member 82 is attached to the body member 84, in adjustably positionable manner, by means of complimentary screw threads, formed on the exterior of the former and the interior of the latter, indicated at 88 and 90, and a locking pin or setscrew 92 extending therebetween. Thus, the disposition of the cover member 82 relative to the body member 84 may readily be adjusted through the convenient removal of the locking pin 92, the rotation of the said cover member relative to the said body member to result in longitudinal movement of the former relative to the latter as a result of the screw-threaded connection therebetween, and the replacement of the said locking pin. The thusly formed cage assembly 70 is rotatably supported from takeup reel drive shaft 15 by bearings 94 and 96 disposed therebetween in apertures provided therefore in the respective cover members 80 and 82.

Cover member 80 includes a plurality of members or extensions, as indicated at 100, of any suitable, high strength permanent-magnet magnetic material, for example carbon steels or those of the Alnico type, projecting therefrom as shown toward the adjacent side faces of the highly magnetically permeable ring 76 and terminating short of the latter to provide an air gap as indicated at 104 therebetween. In similar manner, cover member 82 includes a plurality of members or extensions, as indicated at 106, of the same high-strength permanent-magnetic material as members or extensions 100, projecting therefrom toward the adjacent side faces of the highly magnetically permeable ring 76 and terminating short of the latter to provide an air gap as indicated at 108 therebetween.

Since the disposition of cover member 82 relative to body member 84 is readily adjustable, the extent of air gap 106 is similarly adjustable and may readily be changed by the removal of connecting pin 92 and the rotation of cover member 82 relative to body member 84 as discussed hereinbelow. The distribution of the respective high-strength, permanent-magnetic material extensions on the cover members 80 and 82 and the respective polarities thereof are predetermined to create closed magnetic circuits between the highly magnetically permeable ring 76 on the one hand and the said extensions on the other to thus magnetically couple the ring assembly 68 and cage assembly 70. In addition, the fact that the extent of air gap 108 is readily adjustable, as described above, makes possible the convenient adjustment of the strength of this magnetic coupling to in turn provide for the convenient adjustment of the maximum force which will be transmitted by the said coupling before the latter commences to slip.

The cover member 80 includes a boss 108 formed thereon and a gear 110 is fixedly coupled to the said boss by key means 112 extending therebetween. An aperture 111 is formed or shown centrally of the boss 108 to enable the passage of the takeup reel drive shaft 15 therethrough with suitable clearance to enable relative rotation therebetween. The gear 110 is adapted to be driven by the takeup reel drive motor assembly 113, through the medium of motor-driven gear 115 which meshes as shown with the former, to in turn result in driven rotation of the takeup reel 14 through the medium of the fixed connection of the cage assembly 70 to the said gear, the magnetic coupling of the ring assembly 68 to the said cage assembly, and the fixed connections of the said cage assembly and takeup reel to the takeup reel shaft 15. If desired, the drive motor assembly 113 may be conveniently mounted as shown on the adjacent housing wall 62. The ingress of dirt into bearing 94 through the aperture 111 in boss 108 is prevented by the interposition of a felt washer 114 between the said boss and the adjacent surface of the support means 64; and the ingress of dirt into bearing 96 is prevented by a readily removable plate 116 disposed thereover as shown in the cover member 82.

Prior to the commencement of operation, the disposition of cover member 82 relative to body member 84 is adjusted, if need be, to establish a predetermined maximum force which may be transmitted by the magnetic coupling before the latter commences to slip, to thus establish a predetermined maximum tractional force which may be exerted on the film 16 by the driven rotation of takeup reel 14.

Projection of the film 16, as described hereinabove with reference to FIG. 1, may then be commenced and is of course, accompanied by driven rotation of the gear 110 through the medium of operation of the takeup reel drive motor assembly 113 and attendant rotation of drive gear 115. This rotates the cage assembly 70 which results, in turn, in driven rotation of the takeup reel 14 through the medium of the magnetic coupling of the former with the magnetic ring 76. Thus, the winding of the film 16 on takeup reel 14 is commenced.

Initially, and assuming that the tractional force exerted on the film 16 by the takeup reel 14 has not yet assumed the predetermined maximum value thereof, the ring assembly 68, and thus the said takeup reel, will be rotated at substantially the same speed as the cage assembly 70. As projection continues, the thickness of the film wound on the takeup reel 14, of course, increases, and this is accompanied by an increase in the tractional force exerted on the film by the said takeup reel. This tractional force increase continues until the magnitude of the tractional force exceeds the maximum permissible load of the magnetic coupling between the ring assembly 68 and the cage assembly 70, at which time the former automatically commences to slip with attendant reduction in the speed of rotation of the ring assembly 68, and thus of the takeup reel 14, relative to the speed of rotation of the cage assembly 70. After slippage commences, as the thickness of the portion of the film wound on the takeup reel 14 continues to increase, the rotational speed thereof, and thus of the ring assembly 68 will continuously lag further and further behind the rotational speed of the cage assembly 70 to maintain the tractional force exerted by the said takeup reel on the film practically constant and, in any event, well within safe limits.

With regard to the predetermined maximum permissible load transmittable by the magnetic coupling between the cage assembly 70 and the ring assembly 68 it is to be understood that the same may be readily and conveniently adjusted, for example to compensate for the use of films of differing strength characteristics, by the simple adjustment of the position of cover member 82 relative to body member 84 in the manner described in detail hereinabove to thus result in either of an increase or a decrease in the extent of air core 106. Thus, if it is desired to increase this transmittable load maximum to in turn permit the exertion of a greater tractional force on the film by the takeup reel 14 before the cage assembly ring assembly magnetic coupling commences to slip, all that is required is that cover member be screwed further into body member 84 to provide an appropriate decrease in the extent of the air gap 106 to thus in essence strengthen the said magnetic coupling. Conversely, if a decrease in the said transmittable load maximum is desired, this may be readily effected by the partial unscrewing of the cover member 82 from the body member 84 to an extent sufficient to provide an appropriate increase in the extent of air core 106 and resultant weakening of the said magnetic coupling.

After the film, or at least some portion thereof, has been projected, it generally becomes necessary to rewind the same from the takeup reel 14 to the feed reel 12 (FIG. 1), and this is normally accomplished through the use of nonillustrated feed reel drive means which function to rotate the said feed reel in the direction opposite to the direction of rotation thereof during film projection. The takeup reel drive motor assembly is maintained deenergized during film rewinding, whereby the driven gear 110 and the cage assembly 70 are maintained stationary. Thus, the rewinding of the film onto the feed reel 12, which, of course, requires rotation of the takeup reel 14 in the clockwise direction as seen in FIG. 1 to enable the unwinding of the film therefrom, will also require similarly directed rotation of the ring assembly 68 relative to the now substantially stationary cage assembly 70 in opposition to the magnetic coupling therebetween. As a result, a braking action is constantly applied against the rotation of the takeup reel 14 during film rewinding due to the magnetic coupling between the said cage and ring assemblies, and will function to slow down and/or stop the rotation of the said takeup reel upon an accidental slowing down and/or stoppage of the driven rotation of feed reel 12 to thus provide positive protection against the takeup reel overrunning the film with resultant damage to the latter.

Although repeated reference has been made throughout this specification to the utilization of the magnetic coupling means of the invention in film projection apparatus of the nature depicted for controlling the speed of rotation of the film takeup reel in FIG. 1, it is to be clearly understood that the invention will find equally satisfactory utilization for controlling the speed of rotation of film takeup reels in film projection apparatus which comprise only one film feed reel, and in film projection apparatus which comprise a number of selectively positionable takeup reels in addition to a number of selectively positionable feed reels. In the latter case, a rotatable, takeup reel support drum might be utilized and be adapted to rotate simultaneously with the rotatable feed reel support drum, and the said apparatus may, of course, include film transfer levers and/or film pressing arms of different design, relative position, method of operation, or number, than those depicted in FIG. 1.

In addition, the invention will also find satisfactory utilization in film projection apparatus wherein the film or films to be projected each comprise more than one length or section of film, with each of the said lengths or sections in turn corresponding to a different presentation, as for example a film which contains thereon the performances of a wide variety of different songs by a wide variety of different artists, any one of which lengths or sections may be selected on demand by a patron of a coin-operated film projection apparatus.

In general, it may thus be appreciated that the magnetic coupling of the invention is believed satisfactory applicable to any film handling apparatus, whether automatic or not, directed toward the projection, sound recording, rewinding, editing or printing, etc., of the film which comprises means in the nature of film drive roller 42 of FIG. 1 for moving the film at a substantially constant speed, and rotatable means in the nature of takeup reel 14 upon which the film is wound from the said film drive means.

The very material increase in the useful life of a film made possible by the use of the apparatus of this invention in, for example, coin-operated film projection apparatus of the nature depicted in FIG. 1 is believed clearly illustrated by the fact that the same makes possible over six thousand projections of the film before the film must be discarded, as compared to the only six hundred projections thereof made possible by the same film projection apparatus utilizing the frictional coupling means of the prior art as described hereinabove.

What I claim is:

1. In combination, a support, a magnetic coupling comprising a rotor including an axial shaft, means for mounting said shaft for rotation relative to said support, and a cage assembly mounted for rotation relative to both said rotor and said support, said rotor further including a ring of magnetically permeable material concentric with and fixed relative to said shaft, said cage assembly including a peripheral housing and two end cover plates, a pair of permanent magnets, one of said permanent magnets fixed to each cover plate at one end of each of said magnets and the other end of each of said magnets being in close confronting spaced relation with said ring of magnetically permeable material, a drive motor fixed to said support, means for drivingly connecting said drive motor to one of said cage assembly and said shaft, the other of said cage assembly and said shaft serving as an output for said coupling.

2. The combination of claim 1, wherein one of said end cover plates is threadedly mounted on said peripheral housing for adjusting the spacing between said other end of the permanent magnet secured thereto and said magnetically permeable ring.

3. The combination of claim 1, further comprising at least two additional permanent magnets, one of each of said additional magnets being fixed respectively to one each of said cover plates and the other end of each being in close spaced confronting relation with said magnetically permeable ring.

4. The combination of claim 1, said cage assembly being mounted for rotation relative to said rotor by a pair of spaced-apart bearings disposed on said shaft and rotatably supporting said end cover plates.

5. The combination of claim 4, one of said bearings being axially movable on said shaft, and the end cover plate supported by said one bearing being threadedly connected to said peripheral housing for adjusting the spacing between said other end of said permanent magnet received thereto and said magnetically permeable ring.

6. The combination of claim 3, said cage assembly being mounted for rotation relative to said rotor by a pair of spaced-apart bearings disposed on said shaft and rotatably supporting said end cover plates, one of said bearings being axially moveable on said shaft, and the end cover plate supported by said one bearing being threadedly connected to said peripheral housing for adjusting the spacing between said other ends of said permanent magnets received thereto and said magnetically permeable ring.

7. The combination of claim 1, wherein said drive motor is connected to said cage assembly and said shaft is the output for said coupling.

8. The combination of claim 6, wherein said drive motor is connected to said cage assembly and said shaft is the output for said coupling.